3,491,033
PROCESS OF MAKING SOLID FOAMS
FROM POLYMER EMULSIONS
Edwin R. Dunn, Fremont, Ohio, assignor to Crown Rubber Company, Fremont, Ohio, a corporation of Ohio
No Drawing. Continuation-in-part of application Ser. No. 447,890, Apr. 13, 1965. This application Feb. 26, 1968, Ser. No. 707,965
Int. Cl. C08f *47/10;* C08j *1/14;* C08g *53/10*
U.S. Cl. 260—2.5                                              1 Claim

ABSTRACT OF THE DISCLOSURE

A process of making a solid foam which is applicable to any polymer that is available in the form of an aqueous emulsion and is film forming at a temperature below 300° F., in which an aqueous dispersion of the polymer is converted into a wet foam, and the wet foam is then converted into a solid foam. The process is carried out by incorporating in the aqueous dispersion which is converted to a wet foam, a foaming agent that is incapable of gelling the wet foam, the aqueous dispersion being free of other agents capable of gelling the wet foam and containing not more than 45 weight percent of volatiles, and then subjecting the wet foam to a drying operation without gelling the wet foam, the amount of foaming agent present being sufficient to maintain a foam structure during the drying operation until a solid cellular material is obtained. Finally the solid cellular material is heated to the film-forming temperature of the polymer to cure the polymer.

CROSS-REFERENCE TO RELATED APPLICATION

This is a continuation-in-part of application Ser. No. 447,890, filed Apr. 13, 1965, and now abandoned.

BACKGROUND OF THE INVENTION

The invention relates to a novel method of converting a polymer from an aqueous emulsion or latex into a solid foam.

In any method of converting an aqueous emulsion into a solid foam, the emulsion is first converted into a wet foam, and the foamed emulsion is then transformed into a solid material while retaining its cellular structure. In any such method the transformation of the foamed emulsion into a solid cellular material is a critical step.

That step is critical because a wet foam, as soon as it is formed, begins to collapse so as to lose its cellular structure, so that the transformation of the wet foam into a solid cellular material must be completed before substantial collapse of the wet foam has taken place.

The conversion of an aqueous emulsion or dispersion of a polymer into a wet foam is made possible because of the fact that the polymer is dispersed in a continuous aqueous phase so that the emulsion is highly fluid and therefore can be foamed. Foaming of an emulsion, to convert the emulsion into a wet foam consisting of a mass of bubbles, is performed by subjecting the emulsion to mechanical action, for example by whipping the emulsion or by introducing or generating gas to form bubbles from the emulsion. At the instant when the mechanical foaming action stops, however, the wet foam starts to collapse because the emulsion, consisting of a dispersion of the polymer in a continuous aqueous phase, is still highly fluid.

Heretofore the only way in which a wet foam, formed from an aqueous emulsion of a polymer, could be converted into a solid cellular material so as to prevent the foam from collapsing has consisted in causing gelling of the aqueous emulsion of which the wet foam is composed. The gelling of an aqueous emulsion is a phenomenon in which the particles or globules of the polymer in the aqueous dispersion coalesce to produce a phase inversion so that the polymer phase becomes the continuous phase and the aqueous phase separates into globules which are dispersed in the polymer phase.

By thus gelling the wet foam, it has been possible to prevent collapse of the wet foam, in the case of certain polymer emulsions, because those particular polymers, upon gelling of their aqueous emulsions, form a continuous phase that is sufficiently gelatinous to prevent the foam from collapsing even when the foam is heated to evaporate the water and to dry the foam.

However, it has been possible to prevent the collapse of a wet foam, produced from an aqueous emulsion of a polymer, only in the case of those polymers which have the peculiar property of forming a gelatinous, stiff continuous phase upon gelling of the aqueous emulsion.

Thus U.S. Patent No. 2,706,183, to Mitchell Carter, which describes a method of producing a solid foam that includes the step of gelling a wet foam, describes the method as being applicable only to natural rubber emulsions and synthetic rubber emulsions. U.S. Patent No. 3,215,647, to the present applicant, describes a method of producing a solid foam which includes the step of gelling a wet foam, and which is applicable only to an aqueous emulsion of a polymer having certain reactive substituent groups which permit gelation of the emulsion to be carried out.

There are many other polymers which are available in the form of an aqueous emulsion or latex and which have desirable properties such as heat sealability, solvent resistance, freedom from staining and superior color, but which cannot be converted into a solid foam by any known method.

The known methods of producing a solid foam from an aqueous emulsion of a polymer, all of which include the step of gelling the wet foam, have other inherent disadvantages in that the gelling is difficult to control and also is accompanied by shrinkage of the foam.

SUMMARY OF THE INVENTION

The principal object of the invention is to provide a novel method of making a solid foam which is generally applicable to the production of solid foams from all emulsion polymers that are film forming at temperatures below 300° F., including many emulsion polymers which cannot be made into a solid foam by any known methods. More specific objects and advantages are apparent from the following description, which is intended to disclose and illustrate but not to limit the invention.

The method of the present invention eliminates the step of gelling the wet foam which is an essential step in every known method of producing a solid foam from an aqueous emulsion of a polymer, and which also makes the known methods difficult to control and causes shrinkage.

In the practice of the present method an aqueous emulsion or dispersion of a polymer is converted into a wet foam which is then converted into a solid foam, the distinctive characteristics of the present method being as follows:

(1) A foaming agent that is incapable of gelling the wet foam is incorporated in the aqueous dispersion.

(2) The aqueous dispersion is free of other agents capable of gelling the wet foam.

(3) The aqueous dispersion contains not more than 45 weight percent of volatiles.

(4) The wet foam is subjected to a drying operation without gelling the wet foam.

(5) The amount of foaming agent present is sufficient to maintain a foam structure during the drying operation until a solid cellular material is obtained.

(6) The solid cellular material thus obtained is heated to the film-forming temperature of the polymer to cure the polymer.

The method of the present invention, unlike the known methods of making solid foams from aqueous polymer emulsions, is not limited to certain specific polymers which are capable of forming a stable structure upon gelling of the wet foam, but produces a stable cellular structure without gelling of the wet foam and is applicable to any polymer which is available in the form of an aqueous dispersion and which is film forming at a temperature below 300° F.

The difference between the method of the present invention and a typical prior method disclosed in U.S. Patent No. 2,706,183 to Mitchell Carter has been demonstrated by the following tests:

A wet foam having a density of 0.15 gram per cc. was prepared in accordance with the disclosure of U.S. Patent No. 2,706,183, using the procedure and apparatus described in that patent. The wet foam thus prepared contained the following ingredients.

| Ingredients: | Parts by wt. |
| --- | --- |
| Natural rubber latex (62.5% solids) | 160 |
| Water | 17.6 |
| Zinc mercaptobenzothiazole | 1.5 |
| Zinc dibutyl dithio-carbamate | .5 |
| 4,4-thiobis (6 tert-butyl-m-cresol) | 1.0 |
| Sulfur | 2.3 |
| Oleic acid | .414 |
| Zinc oxide | 3.5 |

For the purpose of comparison, a wet foam according to the present invention was prepared by using the same procedure and apparatus, and by using ingredients which were the same except that the oleic acid, which functions as a gelling agent, was omitted, and the 17.6 parts of water were replaced by 20 parts of an aqueous solution containing 3 parts of sodium N-coco beta-amino propionate and 3.5 parts of di-sodium N-octadecyl sulfosuccinamate. Both of the latter substances are foaming agents, the first substance being a mixture of the sodium salts of N-alkyl beta-amino propionic acids in which the alkyl radicals correspond to the carbon chains of the mixture of fatty acids present in coconut oil.

For test purposes, each of the two wet foams, which had the same density, were applied to sheets of fabric in a thickness of ⅛ inch. The resulting samples were then subjected to the treatment described in U.S. Patent No. 2,706,183, by placing them in a cabinet containing saturated steam at 212° F.

After one minute in the steam cabinet, the samples were examined, and the foam according to U.S. Patent No. 2,706,183 was found to have gelled completely to a solid foam, while the foam according to the present invention was still a wet, ungelled foam. At the end of five minutes in the steam cabinet, the foam according to the present invention was found to have collapsed completely without gelling.

Other samples consisting of a ⅛ inch layer of foam on a sheet of fabric were subjected to circulating air in an oven at 330° F. The samples were examined after they had been in the oven for one minute, and it was found that very little drying had taken place. The foam according to U.S. Patent No. 2,706,183 was found to have gelled completely to a solid foam, but the foam according to the present invention was found to be ungelled, with a thin layer of dried foam on the surface, the remainder of the sample consisting of unchanged wet foam. After five minutes in the oven, the sample of foam according to the present invention was examined and it was found that the layer of dried foam on the surface was considerably thicker than at the end of one minute, while the remainder of the sample still consisted of unchanged wet foam.

After 15 minutes of exposure to circulating air in the oven at 330° F., the foam of the present invention was found to be completely dried and properly cured.

In the method of the present invention, as practiced in the foregoing tests by subjecting a wet foam of the present invention to circulating air in an oven at 330° F., the drying and curing proceed progressively from the top to the bottom of the layer of foam. The rise in temperature of the layer of foam of the present invention also proceeds progressively from the top to the bottom of the layer, because the wet foam in the lower portion of the layer is cooled by evaporation of moisture and the temperature of the wet foam remains relatively low so long as moisture is still evaporating therefrom. The relatively low temperature which prevails in the wet foam in the lower portion of the layer in the practice or the present method helps to prevent collapse of the wet foam.

Although the amount of foaming agent present is sufficient to maintain the cellular structure of the wet foam in the lower portion of the layer in the present method, very gradual merging of the bubbles in the wet foam to form larger bubbles does take place. At the same time, the drying of the foam in the upper portion of the layer in the practice of the present method arrests growth of the size of the bubbles in the upper portion of the layer. Thus it is characteristic of a layer of foam produced by the present method that the size of the bubbles or cells increases slightly from the top to the bottom of the layer.

In contrast, a layer of foam produced by the previously known methods, of which the method disclosed in U.S. Patent 2,706,183 is typical, shows a uniform cell size from the top to the bottom of the layer, because in the prior methods, the wet foam is solidified by uniform gelling of the layer, instead of by drying of the layer of wet foam.

The foregoing tests also demonstrated that the wet foam of the present invention cannot be solidified by the step of subjecting it to saturated steam, which is a step used conventionally in the known methods of producing solid foams from aqueous polymer emulsions. When a wet foam of the present invention is subjected to saturated steam, it does not solidify because it does not contain a gelling agent, but is prevented from drying and therefore collapses.

The foregoing tests also demonstrated the use of relatively large proportions of two foaming agents in order to maintain the foam structure during the drying operation until a solid cellular material is obtained, in the present method.

In summary, the tests demonstrated that the method of the present invention differs from the known methods of converting an aqueous emulsion of a polymer to a solid foam in the following particulars:

(a) In the present method a foaming agent that is incapable of gelling the wet foam is incorporated, the aqueous dispersion being free of other agents capable of gelling the wet foam; whereas in the known methods a gelling agent is incorporated.

(b) In the present method the wet foam is subjected to a drying operation without gelling the wet foam, the amount of foaming agent present being sufficient to maintain a foam structure during the drying operation until a solid cellular material is obtained; whereas in the known methods the wet foam is converted to a solid foam by gelling in order to maintain the foam structure.

In discussing the method disclosed in U.S. Patent No. 2,706,183, which is compared with the present method in the foregoing tests, that patent states "Substituting any of the so-called foaming agents, such as soap, glue, casein, etc. in place of oleic acid, the mix will break down and settle out on standing or in vulcanization, and if a gelling agent is added to prevent this, the process and product are subject to the disadvantages inherent in the prior art." In accordance with the present invention, however, it has been discovered that substituting any of the so-called foaming agents in place of oleic acid will not cause the mix to break down and settle out on standing or in vulcanization, even when no gelling agent is present, provided that the wet foam is subjected to a drying operation, and provided that the amount of foaming agent present is sufficient to maintain a foam structure during the drying operation until a solid cellular material is obtained. This discovery is demonstrated by the foregoing tests.

A further demonstration of the manner in which the present method may be used to produce foam rubber, with the use of various foaming agents, and without the use of oleic acid or any other gelling agent, is given in the appended Example 1.

One of the principal disadvantages of the known methods of producing a solid foam from an aqueous emulsion of a polymer, as compared with the present method, is that the known methods are limited to certain specific polymers which are capable of forming a stable structure upon gelling of the wet foam. The method of the present invention does not rely upon gelling to prevent collapse of the wet foam, and thus is generally applicable to the production of solid foams from all emulsion polymers that are film forming at temperatures below 300° F.

The following tests were conducted to demonstrate that the present method can be used to produce a solid foam from an aqueous emulsion of a polymer other than the rubbers to which the known method disclosed in U.S. Patent No. 2,706,183 is applicable:

A wet foam of the present invention, having a density of 0.15 gram per cc., was prepared by the procedure and apparatus disclosed in U.S. Patent No. 2,706,183, from the following ingredients.

| Ingredients: | Parts by wt. |
| --- | --- |
| Rhoplex E358 (acrylic latex, 60% solids) | 167 |
| Sodium N-coco beta-amino propionate (30% aqueous solution) | 10 |
| Di-sodium N-octadecyl sulfosuccinamate (35% aqueous solution) | 10 |

Two control foams, having a density of 0.15 gram per cc., were prepared by the same procedure and apparatus from ingredients which in one case consisted of 167 parts by weight of Rhoplex E358 and 5 parts of oleic acid, and in the other case consisted of 167 parts of Rhoplex E358 and 10 parts of oleic acid.

In these tests, the foams were applied in a layer ⅛ inch thick on sheets of fabric, and some of the sheets of fabric were placed in a cabinet containing saturated steam at 212° F., while the other sheets of fabric were placed in an oven in which air was circulated at 330° F. Both of the control foams collapsed, in the steam chamber and in the oven. The foam of the present invention collapsed in the steam chamber, in which the drying step of the present method was prevented from taking place. However, when the foam of the present invention as exposed to circulating air in the oven at 330° F., the method of the present invention was carried out, and an excellent solid foam was produced in about 15 minutes.

The foregoing tests demonstrated that Rhoplex E358 is a polymer emulsion which does not gel in such a manner as to prevent the wet foam from collapsing when an attempt is made to use it in the method of U.S. Patent 2,706,183. These tests and the examples hereinafter set forth show that the method of the present invention can be used to produce solid foams from a great variety of polymer emulsions which could not be converted into solid foams by any known method.

The gelling which takes place in the known methods is difficult to control, particularly in methods which are carried out as continuous processes. The ingredients must be mixed before the emulsion is foamed, and the gelling must be timed so that it does not take place until the emulsion has been converted into a foam and placed in a mold or on a substrate.

In the known methods of producing solid foams, the necessity for controlling the timing of the gelling of the polymer makes it necessary that the chemical agent which causes the gelling be introduced into the composition at the last possible instant. For example, when foamer heads are used to convert the latex into a foam, the chemical gelling agent usually is supplied under pressure and introduced into the latex entering the foamer heads.

In the known methods the rate of collapse of the wet foam accelerates sharply as the temperature increases. Thus it becomes a critical problem to have the gelling take place before the foam collapses, but not before the emulsion has been converted into a foam. Also in the known methods the speed of gelling is affected by the temperature of the foam, which must be closely controlled.

Because the temperature affects the speed of gelling in the known methods of producing solid foams, the temperature ranges which can be employed in these methods are strictly limited. This places a further limitation on the types of polymers which can be used in the known methods, because the polymers which can be used are limited to those which are film forming at the temperatures which can be employed in these methods. At the same time the polymer emulsions which can be used in the known methods are limited to those which, upon gelling of the wet foam, are sufficiently stiff and gelatinous to prevent the wet foam from collapsing.

Another inherent disadvantage of the known methods of making solid foams is that shrinkage occurs in the gelling of the foams. This shrinkage becomes more severe if the gelling is caused to take place too quickly in the known methods. The shrinkage which occurs in the known methods cannot be prevented by retarding the gelling, because retarding the gelling causes the formation of cracks in the surface of the foam.

The shrinkage caused by the gelling that takes place in the known methods of producing solid foams undesirably increases the density of the foams produced by these methods. Also the dimensions of a product produced by any of these known methods are indeterminate because the amount of shrinkage of the foam that takes place is not entirely predictable.

One improvement obtained in the practice of the present invention is the elimination of the shrinkage which was caused by the gelling that occurred in every method heretofore known for converting an aqueous emulsion of a polymer into a solid foam.

The present method also is much easier to control than the methods previously known. In the methods previously known, the conditions of operation as well as the proportions of ingredients had to be controlled so that gelling would not take place too soon or too late.

The emulsion which is foamed in the practice of the present invention is in a chemically stable state. Since the present method does not employ a gelling step, it is not necessary in the present method to use any of the chemical reactions heretofore employed to cause gelling, such as cross-linking of the polymer, gradual releasing of an acid to reduce the pH to the point at which gelling occurs, or freezing the foam and then acidifying it by saturating it with carbon dioxide.

A basic advantage of the present method is that any polymer emulsion can be used which has physical properties such that it can be made into a suitable wet foam. In contrast, a polymer emulsion in order to be usable in any of the methods heretofore known not only had to be capable of being foamed but also had to be capable of remaining in the form of a reasonably stable foam after gelling took place. Only a limited number of emulsion polymers have properties such that they could be used in the methods heretofore known, whereas the present method is generally applicable to all emulsion polymers which are film forming at temperatures below 300° F.

In the present method surface tension effects are relied upon to maintain the emulsion in the form of a foam until it has dried to a cellular solid. In the methods heretofore known, surfactants have been used as foaming agents to enable the emulsion to be foamed. In the present method greatly increased amounts of the surfactants are used, in order to maintain the structure of the foam during the drying operation.

It has been found that the foam remains more stable when the foamed emulsion is subjected to a drying operation with the polymer still in a dispersed phase, as practiced in the present method, than when gelling is carried out as practiced in the methods heretofore known. Thus the present method not only eliminates the shrinkage which was attendant upon gelling in the prior methods but also makes it possible to operate with a foam of lower density at a given filler content, so as to produce solid foams of desirable low density which because of their low density and high filler content are lower in cost than the solid foams obtainable by the methods heretofore known.

FOAMING AGENT

The amount of a foaming agent which is used in an emulsion that is foamed in the practice of the present invention depends upon the particular foaming agent but usually is an amount equal to 1.5 to 15 percent of the weight of the polymer in the emulsion. Higher amounts can be used but may detract from the properties of the final product. The amount thus measured may consist of a single foaming agent or a complex, consisting of one or more foaming agents, foam stabilizers and boosters, which functions as a foaming agent. The particular amount selected for use in a given emulsion should be an amount that permits the emulsion to be foamed into a foam structure which retains a cellular form during the drying operation that follows the foaming step, so that the drying operation results in a solid cellular material.

If a proper amount of the foaming agent is used in the practice of the present method, the foam will not collapse during the drying operation, and the polymer particles will not migrate to the surface with the water so as to leave a hollow shell. It has been found, however, that there is always enough breakage of the cells in the practice of the present method so that an "open cell" structure is obtained.

The foaming agent selected for use with a particular polymer emulsion may be any of the conventional foaming agents which are suitable for use therewith.

Foaming agents which may be used in the practice of the invention include alkyl sulfates of alkali metals in which the alkyl radical has from 12 to 14 carbon atoms, such as sodium lauryl sulfate; alkali metal salts of sulfated condensation products of ethylene oxide with an aliphatic alcohol having from 10 to 18 carbon atoms; alkali metal salts of esters of alpha-sulfo substituted fatty acids having from 10 to 16 carbon atoms; alkali metal salts of palmitic acid or an unsaturated fatty acid having more than 14 carbon atoms such as oleic acid or linoleic acid; alkali metal salts of amphoteric surfactants of the general formula RR'NR"COOH in which R is an alkyl radical having from 10 to 18 carbon atoms, R' is hydrogen or an alkyl radical having not more than 12 carbon atoms and R" is a divalent aliphatic hydrocarbon radical having from 1 to 5 carbon atoms; alkali metal salts of esters of sulfo acetic acid with an aliphatic alcohol having from 10 to 18 carbon atoms; alkali metal salts of alkyl isothionates in which the alkyl radical has from 10 to 18 carbon atoms; alkali metal salts of amides of sulfo-substituted fatty acids having from 10 to 16 carbon atoms; tetra alkali metal salts of N-(1,2-dicarboxy ethyl) N-alkyl sulfo-succinamic acids; di alkali metal salts of N-alkyl sulfo-succinamic acids; alkali metal salts of N-methyl taurates of fatty acids having from 10 to 14 carbon atoms; amphoteric surfactants having the general formula

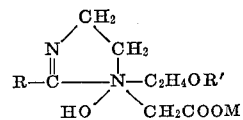

in which R is an alkyl radical having from 10 to 18 carbon atoms, R' is H, Na or CH$_2$COOM, and M is Na or an organic base; and amphoteric surfactants having the general formula

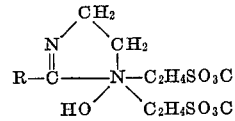

in which R is an alkyl radical having from 10 to 18 carbon atoms and M is Na or an organic base.

The "foaming agent" used in the practice of the invention may consist of one or more of the substances mentioned above, and if desired may include, in addition, one or more foam stabilizers or boosters, such as a homolog of one of the substances mentioned above having a slightly greater number of carbon atoms; methyl cellulose; polyvinyl alcohol; aliphatic alcohols having from 10 to 16 carbon atoms; condensation products of ethylene oxide with fatty alcohols; alkyl aryl polyethoxyethanols; alkali metal salts of alkyl aryl sulfonates; alkali metal salts of sulfonated alkyl aryl polyethoxyethanols; colloidal silica; and alkali metal salts of water soluble polyacrylates.

In the selection of a foaming agent for use in the practice of the invention, consideration should be given to the type of emulsion stabilizer used in the preparation of the polymer emulsion. Thus the foaming agent to be used with a particular polymer emulsion should be one which is compatible with the emulsion stabilizer that was used in the preparation of the polymer emulsion. For example, if the emulsion stabilizer is anionic, the foaming agent selected should be one which is anionic or non-ionic. If the emulsion stabilizer is cationic, the foaming agent selected should be cationic or non-ionic.

Often it is advantageous to use in the preparation of the polymer emulsion, as the emulsion stabilizer, a foaming agent as hereinbefore described, which then serves not only as the emulsion stabilizer for the polymer emulsion but also as part of the foaming agent in the practice of the present method of producing a solid foam.

POLYMER EMULSION

The present invention is generally applicable to any polymer emulsion which, in the final stage of polymerization, is film forming at temperatures below 300° F. In some cases the film forming properties of the emulsion are due not solely to the properties of the polymer but partly to the presence of solvents or plasticizers.

The polymer emulsions heretofore in general use for the production of solid foams have consisted of natural rubber latex, certain polymers of 2-chloro-1,3-butadiene, and the GRS cold rubbers. The present method of producing solid foams is applicable to those polymer emulsions and also to other polymer emulsions which have not heretofore been usable for the production of solid foams, including polymer emulsions prepared from ethylenically unsaturated monomers such as styrene; other vinyl aromatic compounds such as alpha-methylstyrene, ar-methylstyrenes, ar-ethylstyrenes, alpha, ar-dimethylstyrenes, ar, ar-dimethylstyrenes ar-t-butyl styrenes, vinylnaphthalenes, methoxystyrenes, cyanostyrenes, acetylstyrenes, monochlorostyrenes, dichlorostyrenes and other halostyrenes; monomers which are copolymerizable with styrene, such as derivatives of ethylenically unsaturated acids, including acrylic esters such as methyl acrylate, ethyl acrylate, butyl acrylate, hexyl acrylate, 2-ethylhexyl acrylate, lauryl methacrylate, phenyl acrylate, ethyl alpha-chloroacrylate, methyl methacrylate, ethylmethacrylate, 2-hydroxyethylacrylate, 2-sulfo-ethylacrylate and glycidylmethacrylate; acrylic nitriles such as acrylonitrile and methacrylonitrile; maleic or fumaric esters such as diethyl maleate and polyglycol maleate; unsaturated alcohol esters such as vinyl or allyl esters; unsaturated ketones such as vinyl methyl ketone and methyl isopropenyl ketone; olefins containing conjugated double bonds such as 1,3-butadiene and isoprene; and various other compounds containing one or more ethylenic linkages capable of addition polymerization, such as vinyl chloride, vinyl bromide, vinylidene chloride, vinylidene bromide and vinyl ethyl ether.

In most cases the polymer emulsion used in the present method contains a copolymer, but in some cases the emulsion may contain a polymer prepared from a single monomer such as isoprene, vinyl chloride, ethylene, vinyl acetate, propylene, butene or an acrylic ester.

In the practice of the present invention it is often advantageous to use a copolymer containing a so-called "copolymerized emulsifier." The advantage of using an emulsion of such a copolymer is that the emulsion is obtainable with little or no emulsion stabilizer in the aqueous phase. Thus in determining the amount of foaming agent to be added to such an emulsion in the practice of the invention, little or no consideration needs to be given to the emulsion stabilizer, if any, already present in the aqueous phase. An emulsion of a polymer containing a copolymerized emulsifier may be obtained by copolymerizing one of the monomers mentioned above with a polymerizable ethylenically unsaturated monomer which has a pendant hydrophilic substituent group or groups such as carboxy, sulfo, primary amino, secondary amino, carboxamido, methylolcarboxamido, sulfonamido, primary hydroxyl, secondary hydroxyl, phenolic hydroxyl, aldehydic or epoxy groups, or which has a substituent group or groups which, subsequent to polymerization, can be converted to such hydrophilic substituent groups, e.g., ester, nitrile, amide, or salt groups which can be hydrolyzed to reactive acid, amine, or hydroxyl groups. Examples of such ethylenically unsaturated monomers having pendant hydrophilic substituent groups are acrylic acid, methacrylic acid, itaconic acid, fumaric acid, maleic acid, ethyl acid maleate, 2-sulfoethyl acrylate, 2-sulfoethyl methacrylate, 2-aminoethyl methacrylate hydrochloride, 2-aminoethyl acrylate hydrochloride, vinyl benzylamine, glycidyl methacrylate, hydroxystyrene, acrolein, methacrolein, allyl alcohol, vinylbenzyl alcohol, 2-hydroxyethyl acrylate, 2-hydroxyethyl methacrylate, acrylamide, bis-N-methylol acrylamide, N-methylolacrylamide, N-methylolmethacrylamide, bis-N-methylolmethacrylamide, methacrylamide, N-beta-hydroxyethyl acrylamide, N-beta-hydroxyethyl methacrylamide, beta-hydroxypropyl acrylate, beta-hydroxypropylmethacrylate, gamma-hydroxypropyl acrylate, gamma-hydroxypropyl methacrylate, 6-hydroxyhexyl acrylate, 6-hydroxyhexyl methacrylate, sodium styrene sulfonate, sodium alpha-methylstyrene sulfonate, 2-methylaminoethyl acrylate hydrochloride, 2-methylaminoethyl methacrylate hydrochloride, 3-methylaminopropyl acrylate hydrochloride, 3-methylaminopropyl methacrylate hydrochloride, 3-methylaminobutyl acrylate hydrochloride, 3-methylaminobutyl methacrylate hydrochloride, 3-ethylaminopropyl acrylate hydrochloride, and styrene sulfonamide.

When a copolymerizable emulsifier mentioned above is used in preparing a copolymer, it may constitute from about 0.5 to about 20 percent by weight of the total monomer constituents.

Such polymers containing copolymerized emulsifiers are reactive with various cross-linking agents, and such polymers have been used heretofore in the production of solid foams by foaming aqueous emulsions of such polymers and then causing the polymers in the foamed emulsions immediately to react with a cross-linking agent so as to gel the polymers. In the practice of the present invention, if a cross-linking agent is used in an emulsion containing such a polymer, the conditions should be controlled so that the cross-linking reaction, which might cause gelling, does not take place during the drying of the foam, but takes place only when the dried cellular material is heat treated in the subsequent curing or fusing operation.

The cross-linking agents that may be used with such a copolymer include those substances which may be incorporated in the emulsion and which contain in the molecule at least two groups that are reactive with the copolymer. Examples of such cross-linking agents are melamine, melamine-formaldehyde condensates, urea, urea-formaldehyde condensates, methylated melamine-formaldehyde condensates, methylated urea-formaldehyde condensates, butylated melamine-formaldehyde condensates, butylated urea-formaldehyde condensates, phenol-formaldehyde condensates, ammonia-formaldehyde-hydrochloric acid condensates, liquid epoxy resins, ethylene diamine-formaldehyde condensates, hexamethylene diamine-formaldehyde condensates, polyethyleneimine, ethylene diamine, diethylene triamine, triethylene tetramine acetate, trimethylene diamine, tetramethylene diamine, hexamethylene diamine, decamethylene diamine, tetraethylene pentamine, guanidine, formoguanamine, benzoguanamine, dicyandiamide, malonic acid, succinic acid, glutaric acid, adipic acid, pimelic acid, suberic acid, azeleic acid, sebacic acid and polyacrylic acid. Also, such a copolymer containing reactive pendant hydrophylic substituent groups may be cross-linked by reacting it with another copolymer containing reactive groups. For example, a copolymer containing copolymerized N-methylolacrylamide may be reacted with a copolymer containing copolymerized acrylic acid.

The polymer emulsions used in the practice of the present invention are prepared by polymerization in aqueous emulsions containing surfactants, catalysts and other modifiers, and under conditions such as time, temperature, pressure and agitation in accordance with well known principles of emulsion polymerization.

PRODUCTION OF SOLID FOAM

The polymer emulsion that is foamed in the practice of the present invention may contain any of the conventional agents that are required to effect the final cure of the polymer in the emulsion, such as accelerators and vulcanizing agents, together with other usual ingredients such as antioxidants and fillers. In general the original polymer emulsion contains not more than 60 percent of volatiles, and the emulsion containing all added ingredients, ready for foaming, contains not more than 45 percent of volatiles.

The foaming step is carried out in the conventional manner by the use of a blowing agent or by mechanical foaming. If a blowing agent is used, it may be any one of the conventional blowing agents which release a non-coagulating gas such as nitrogen. Alternatively, the blowing agent may be one which is decomposed by reacting with another ingredient in the emulsion to liberate a non-coagulating gas as a reaction product. If mechanical foaming is used, it may be carried out by the use of conventional whipping apparatus, or by pumping the emulsion through foaming heads of the conventional type. During the foaming step, the volume of the emulsion is increased to 5–15 times its initial volume.

The foam is then poured into molds, spread on a flat tray or belt, or coated onto a substrate consisting of any material to which the foam will adhere after it is in final solid form, such as cloth, fabric, leather, wood, glass or metal.

The gelling step heretofore used at this point is omitted, and the chemical gelling agent heretofore employed is not used in the present method. However, the amount of foaming agent employed in the present method is substantially greater than the amount of foaming agent used in prior methods, and is sufficient to maintain a foam structure during the drying operation until a solid cellular material is obtained. The drying operation is carried out at an elevated temperature, usually from 280° to 400° F.

In the methods heretofore known for the production of solid foams, film formation occurred in the gelling of the polymer. In the present method, however, drying proceeds with the foam in the state in which it is initially formed, the polymer being in a dispersed phase and ungelled, and there is no actual film formation during the drying operation, the foam structure being maintained by surface tension as evaporation of the water proceeds. It has been found that the overall structure of the foam is preserved remarkably well in the present method, but that an open-cell solid foam of excellent permeability is obtained.

As the volatiles evaporate during the drying operation, the temperature of the foam produced by the present method rises until the polymer reaches its film-forming temperature. The final heat treatment is carried out at the temperature and for the time required to impart the desired final properties to the polymer. During such heat treatment any necessary chemical reaction such as cross-linking or sulfur vulcanization is completed.

EXAMPLE 1

Several tests were carried out with Pliolite 5352 latex, which is a cold-polymerized latex containing butadiene and styrene in a weight ratio of 70:30 that has been concentrated to a non-volatile content of 69 percent. This particular latex is conventionally used in know methods of producing foam rubber. The following basic formulation, prepared by stirring the ingredients together, was used for the tests:

|  | Dry parts |
| --- | --- |
| Pliolite 5352 latex | 100 |
| 40% solids zinc oxide dispersion | 4 |
| 50% solids zinc mercaptobenzothiazole dispersion | 1.5 |
| 50% solids diethyldithiocarbamate dispersion | .5 |
| Alkylated phenol anti-oxidant | 1 |
| Ground felspar filler | 150 |
| 68% sulfur dispersion | 1.5 |

The foregoing formulation, with the addition of a foaming agent consisting of 2 dry parts of a potassium soap of tall oil fatty acids containing 12 percent by weight of rosin fatty acids, together with a gelling agent such as sodium silico fluoride and a sensitizing agent such as diphenyl guanidine, is a composition of the type conventionally used in the methods heretofore known for the production of solid foams.

(A) The foregoing basic formulation, without the addition of the usual gelling and sensitizing agents, and with the incorporation of nine dry parts of the potassium tall oil soap instead of the usual two parts, was mechanically foamed in a planetary mixer to give a wet foam density of .24 gram per cubic centimeter. The foam was then doctored into a ¼ inch mold and placed in a forced air, electrically heated oven at 300° F. to dry. In 12 minutes a sheet of solid foam ¼ inch thick having a good foam structure was obtained.

(B) A sheet of solid foam was prepared by a procedure which was the same as that of paragraph A except that the foaming agent consisted of six dry parts of a mixture of the sodium salts of N-alkyl beta-amino propionic acids in which the alkyl radicals corresponded to the carbon chains of the mixture of fatty acids present in coconut oil. The wet foam had a density of 1.2 grams per cubic centimeter, and the solid foam had a density of 4.5 pounds per cubic foot. In contrast, the minimum density of the solid foam that can be obtained from this basic formulation by any method heretofore known, using a conventional gelling agent and using the ordinary amount of a foaming agent, is about 7.5 pounds per cubic foot.

(C) A solid foam of excellent structure was prepared by a procedure which was the same as that of paragraph B except that the amount of the foaming agent was nine dry parts instead of six parts. In this case the density of the wet foam was only .19 gram per cubic centimeter as compared with the density of 1.2 grams per cubic centimeter of the wet foam produced in accordance with paragraph B.

(D) A solid foam was prepared by a procedure which was identical to that of paragraph C except that the foaming agent, instead of a derivative of propionic acid, consisted of an identical amount of the corresponding derivative of butyric acid. The results obtained were identical to those obtained by the procedure of paragraph C.

(E) Seven tests were carried out by procedures which in each case were the same as that of paragraph A except that nine parts of a different foaming agent were used. Table 1 below gives the foaming agent and the results obtained in each test.

TABLE 1

| Foaming Agent | Wet Foam Density, gm./cc. | Structure of Dried Foam |
| --- | --- | --- |
| (1) Sodium lauryl sulfate | .19 | Excellent. |
| (2) Di sodium N-octadecyl sulfosuccinamate | .33 | Do. |
| (3) Tetra sodium N-(1,2-dicarboxyethyl) N-octadecyl sulfosuccinamate. | .33 | Do. |
| (4) Sodium N-lauryl sarcosinate | .23 | Good, slight shrinkage. |
| (5) Coconut oil fatty acid betaines | .185 | Excellent. |
| (6) Sodium lauryl sulfoacetate | .25 | Do. |
| (7) 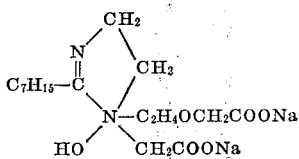 | .21 | Do. |

EXAMPLE 2

In six additional tests the basic formulation used was the same as that of Example 1 except that a different latex was employed. The foaming agent used in these tests consisted of nine dry parts of sodium coco sulfate (a mixture of sodium alkyl sulfates in which the alkyl radicals are those corresponding to the carbon chains of the mixture of fatty acids in coconut oil). In these six tests, six different types of latex were used to supply the 100 dry parts of this ingredient, as follows:

(A) A butadiene-styrene copolymer latex of the GRS2105 type, containing 62.5 percent solids (Pliolite 2105).

(B) A butadiene-vinyltoluene copolymer latex of the GRS2000 type (Dow latex 2582).

(C) A natural rubber latex concentrate containing 62.5 percent solids.

(D) A polyisoprene emulsion containing 65 percent solids (Shell isoprene latex 700).

(E) A butadiene-acrylonitrile latex (Hycar 1552).

(F) A polychloroprene latex (neoprene 635).

In each test the emulsion was foamed in a planetary mixer. The foam was then coated in a thickness of ¼ inch on cotton sheeting and then dried at 280° F. to give a low density solid foam having properties characteristic of the particular polymer.

EXAMPLE 3

The following ingredients were blended in a high speed mixer:

|  | Parts by wt. |
|---|---|
| Dioctyl adipate | 16.5 |
| Butyl benzyl phthalate | 16.5 |
| Diisodecyl phthalate | 16.5 |
| Polymeric epoxy plasticizer (Monoplex S–73) | 16.5 |
| Sodium lauryl sulfate | 4 |
| Water | 25 |

The resulting emulsion was then blended in the high speed mixer with a 100 dry parts of latex prepared by emulsion polymerization of 95 parts by weight of vinyl chloride and 5 parts by weight of dibutylmaleate, to produce an oil in water emulsion. This emulsion was mixed with 80 parts of powdered aluminum hydrate and then foamed in a planetary mixture, poured into a ¼ inch mold and dried and fused at 325° F. The resulting solid foam was soft and flexible, and was thermoplastic so that it could be post formed or bonded to a suitable substrate by reheating it to 275° F.

EXAMPLE 4

A test was carried out with a latex containing a copolymerized emulsifier (acrylic acid) constituting about 5 weight percent of a terpolymer, the other components of which consisted of about 35 weight percent of styrene and 60 weight percent of 1,3-butadiene. This latex (100 dry parts) was stirred with 80 parts of aluminum hydrate powder. 1 part of alkylated phenol anti-oxidant, 3 parts of a petroleum wax emulsion, 3 parts of sodium coco sulfate and .25 dry part of 4000 cps. methyl cellulose. The emulsion was the foamed in a planetary mixer, poured into a mold and dried at 300° F. to produce a soft, strong, solid foam with good initial color and excellent aging properties.

EXAMPLE 5

A procedure was carried out which was the same as that of Example 4 except that before foaming a water soluble melamine-formaldehyde reaction product (5 dry parts) was added and the pH of the emulsion was adjusted to 10.5 by addition of ammonium hydroxide. With this high initial pH the melamine-formaldehyde reaction product remained inactive untli the foam was dry, and gelling during the drying operation was prevented. However, after the foam was dry, its temperature rose and cross-linking took place. The resulting final product was very similar to that obtained in accordance with Example 4 but had better compression set resistance and improved washability.

EXAMPLE 6

In order to demonstrate that the present method is generally applicable to any aqueous emulsion of a polymer that is film forming at a temeprature below 300° F., tests were carried out with several emulsions, none of which was designed for use in the preparation of a solid foam, and none of which could be used in any method heretofore known for the production of a solid foam. In each of these tests the following formulation was used:

|  | Percent Solids | Dry Parts |
|---|---|---|
| Latex | 40–55 | 100 |
| Sodium coco sulfate | 30 | 3 |
| Di sodium N-octadecyl sulfosuccinamate | 35 | 3.5 |
| Aluminum hydrate powder | 100 | 150.0 |

The ingredients were blended and then foamed in a planetary mixer, and the resulting wet foam was applied in a layer ¼ inch thick on a fabric and dried at 300° F.

(A) When a polyvinylchloride latex containing 50 percent solids (Dow latex 700) was used, with the addition of 60 parts of diisodecyl phthalate, the product was a semi-rigid thermoplastic foam having a density of about 8 pounds per cubic foot.

(B) When a polyethylene emulsion containing 40 percent solids (Polyem 11) was used, the product was a rigid thermoplastic foam having a density of about nine pounds per cubic foot.

(C) When a hot-polymerized medium butadiene-styrene latex (Pliolite latex 140) was used, the product was a soft, flexible foam with excellent shock absorbing characteristics having a density of about 10 pounds per cubic foot.

(D) When a copolymer latex of the acrylate type containing 40 percent solids (Rhoplex HA–12) was used, with its pH adjusted to 9.5, the product was a semi-rigid foam with good solvent resistance and with excellent heat and light aging properties, having a weight of about 8.5 pounds per square yard.

(E) When a medium butadiene-acrylonitrile latex having a solids content of about 55 percent (Chemigum 248) was used, thep roduct was a soft, rubbery foam which was heat sealable and had a density of about 11 pounds per cubic foot.

(F) When a polyvinyl acetate emulsion having about 55 percent solids (Elvacet 1440) was used, the resulting foam was rigid and had a density of about 13 pounds per cubic foot.

EXAMPLE 7

In five additional tests the basic formulation was the same as in Example 1 except that a different filler (200 parts) was used in place of the ground felspar, and the zinc oxide dispersion was omitted. The foaming agent used in each test consisted of 3 parts of sodium coco sulfate and 3.5 parts of di-sodium N-octadecyl sulfosuccinamate. In each of these tests one of the following filelrs was used.

calcium carbonate
dolomite
50 parts talc—150 parts felspar
100 parts kaolin clay—100 parts felspar
barium sulfate In each case a foam of good structure was obtained by processing as described in Example 1A.

What is claimed is:
1. A process of making a cellular solid material that comprises the step of converting into a wet foam an aqueous dispersion of a polymer, having a film-forming temperature below 300° F., which is a product of the polymerization of at least one ethylenically unsaturated substance, which dispersion contains a foaming agent of the class consisting of anionic, cationic and non-ionic foaming agents, wherein the improvement comprises the steps of heating the wet foam to dry it while maintaining a cellular structure, by evaporating moisture from the wet foam to convert the wet foam progressively into a solid cellular material, without gelling the wet foam, the aqueous dispersion which is converted into a wet foam containing not more than 45 weight percent of volatiles and being free of agents capable of gelling the wet foam, and the amount of foaming agent in the dispersion being sufficient to maintain a foam structure during the drying operation as the wet foam is converted into a solid cellular material; and heating the solid cellular material to the film-forming temperature of the polymer.

References Cited

UNITED STATES PATENTS 2,706,183  4/1955  Carter.

SAMUEL H. BLECH, Primary Examiner

MORTON FOELAK, Assistant Examiner

U.S. Cl. X.R.

260—29.6, 29.7, 41, 41.5, 844, 845, 851, 852

PO-1050
(5/69)

UNITED STATES PATENT OFFICE
CERTIFICATE OF CORRECTION

Patent No. 3,491,033      Dated January 20, 1970

Inventor(s) Edwin R. Dunn

It is certified that error appears in the above-identified patent and that said Letters Patent are hereby corrected as shown below:

Column 8, line 17, that portion of the formula reading "$C_2H_4SO_3C$" should read -- $C_2H_4SO_3M$ --; line 18, that portion of the formula reading "$C_2H_4SO_3C$" should read -- $C_2H_4SO_3M$ --.
Column 13, line 44, "untli" should read -- until --.
Column 14, line 20, "thep roduct" should read -- the product --
line 34, "filelrs" should read -- fillers --.

SIGNED AND
SEALED
AUG 11 1970

(SEAL)
Attest:

Edward M. Fletcher, Jr.
Attesting Officer

WILLIAM E. SCHUYLER, JR.
Commissioner of Patents